June 3, 1952   S. S. POKORNY   2,599,348
SCOOP SWINGING MECHANISM
Filed Jan. 26, 1948
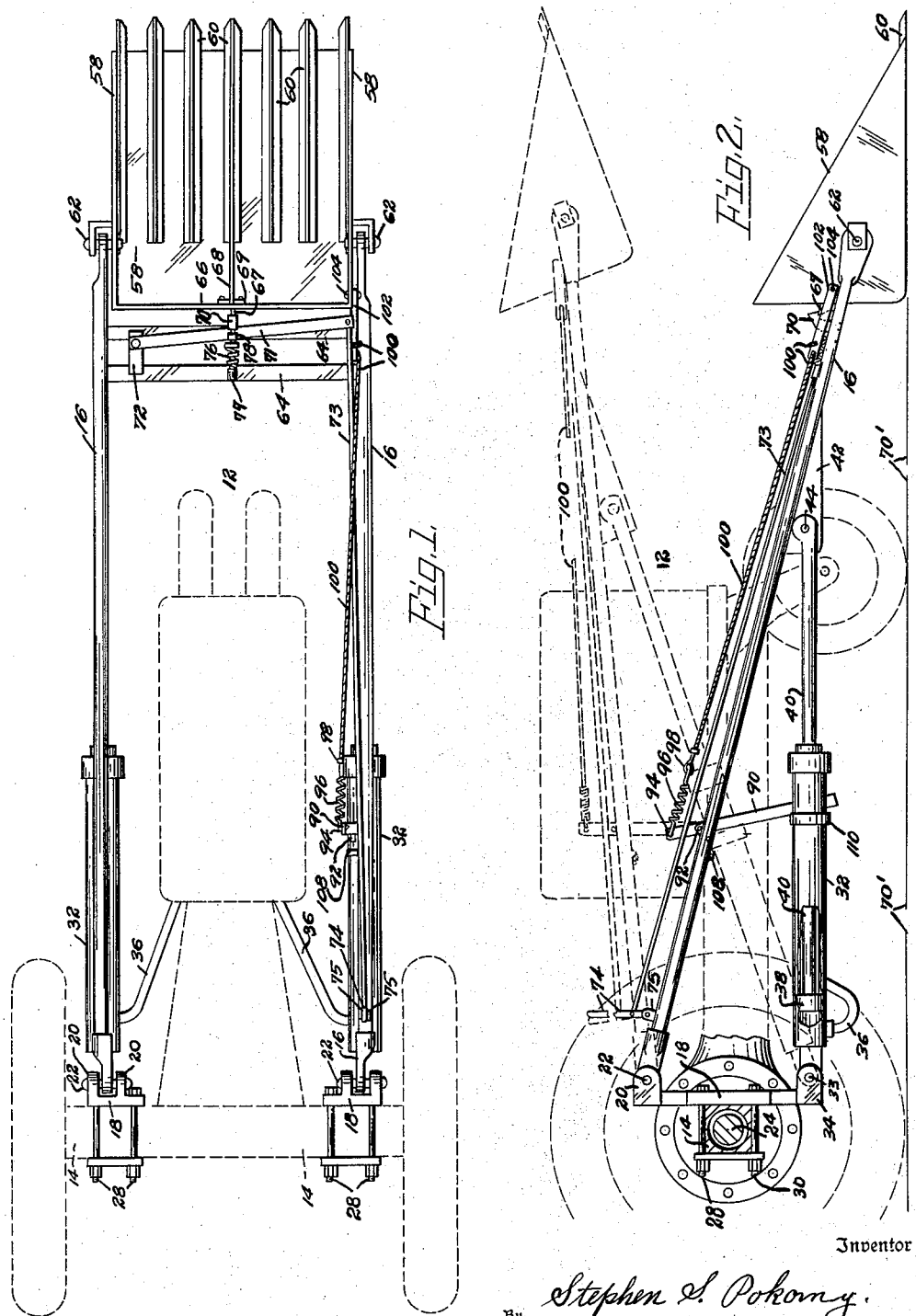
Inventor
Stephen S. Pokorny.
By Arthur H. Sturges
Attorney

Patented June 3, 1952

2,599,348

UNITED STATES PATENT OFFICE 2,599,348

SCOOP SWINGING MECHANISM

Stephen S. Pokorny, Maquoketa, Iowa

Application January 26, 1948, Serial No. 4,440

1 Claim. (Cl. 214—140)

This invention relates to material moving devices and more particularly it is an object of the invention to provide a scoop tilting device therefor.

In the operation of material moving devices the scoops of the latter are first disposed in a down position for scooping up material at a time when the latter is lying on the ground. The scoop is then elevated to an up position and the material moving mechanism is driven to a desired dumping point, the operator then manipulates a lever or other control apparatus for dumping the scoop. In repeating this operation the scoop is again lowered to the ground and such lever or control apparatus is again manipulated by the operator for locking the scoop in a shoveling position.

Throughout these operations the driver is busy with one of his hands on the steering apparatus of the material moving mechanism and the other of his hands is usually fully occupied with the shifting of the gears in the tractor, or other propelling mechanism of the material mover, as well as being occupied with the control employed for raising and lowering the scoop and scoop-supporting booms. As a result it is desirable to have means for retaining the scoop in an up position and for automatically returning the scoop to a shoveling position when the booms are lowered to the position for scooping material.

An object of this invention is to position the scoop mounting elements of a tractor scoop attaching mechanism to provide automatic returning of the scoop to the scooping position.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

In the drawings:

Figure 1 is a top plan view of the scoop tilting device of the invention shown as attached to the material lifting mechanism of a tractor, the tractor being shown in dotted line; and Figure 2 is a side elevation of the mechanism shown in Figure 1, a wheel of the tractor and a portion of a hydraulic cylinder employed being broken away, the rear axle and rear axle housing being shown in section, an "up" position of the booms and scoop, prior to the release of the scoop for dumping, being shown in dotted lines.

The loading mechanism of this invention is generally indicated at 10 and is preferably for attachment to a tractor generally indicated at 12 in dotted lines.

The tractor 12 is preferably of a type provided with a square rear axle housing 14 and further provided with an oil pump unit adapted to operate fluid pressure operated attachments and having suitable valve means, not shown, for controlling the operation of such attachments.

The loading mechanism 10 includes a pair of lifting arms 16 arranged at opposite sides of the tractor 12. The rearward ends of the arms 16 are pivotally attached adjacent the rearward end of the tractor 12 and preferably by means of a pair of brackets having supporting plates 18. The supporting plates 18 are preferably in a vertically disposed position and are preferably provided each with a pair of horizontally extending ears 20 at the upper ends thereof, to which latter the flattened rearward ends 23 of the lifting arms 16 are pivotally attached by means of a pair of pins 22. The supporting plates 18 may be secured in any suitable manner to the rear axle housing of the tractor 12; however, when the tractor 12 is one of the type having a square rear axle housing 14 surrounding its rear axle 24, then the supporting plate 18 is positioned flush against the forward side of the rear axle housing 14, and a backing plate 26 is placed against the rearward side of the rear axle housing. Each backing plate is secured to its corresponding supporting plate by means of a pair of bolts 28 which are disposed above the rear axle housing and the second pair of bolts 30 which are disposed below the rear axle housing, the said bolts being positioned in apertures in the supporting plate 18 and the backing plate 26.

Means are provided for raising the lifting arms 16 and such means includes a pair of hydraulic jacks 32 having their cylinders pivotally attached to the opposite sides of the rearward end of the tractor 12.

Preferably, each of the cylinders 32 is provided with a flattened tab 31 on the rearward end thereof which are attached by means of a pin 33 to a pair of horizontally extending ears 34 which are in turn attached to the lower end of the corresponding supporting plate 18, the supporting plate 18 being of such a length as to extend both above and below the rear axle 24 of the tractor 12.

The jack cylinders 32 are attached to a source of hydraulic pressure such as an oil pump unit, not shown, the interconnection between the jack cylinders 32 and the oil pump unit being made by a pair of flexible conduits 36.

The jacks 32 are each provided with pistons 38 and piston rods 40, the outward ends of the piston rods 40 being each pivotally attached to the lower side and adjacent the front end of the lifting arms 16, the attachment being preferably made by means of a pair of triangular connection plates 42 which are suitably attached to the under side of the lifting arms 16, the piston rods 40 being pivotally secured to the connecting plates 42 by means of a pair of pins 44. Preferably, the jacks 32 are of such length when in a collapsed position that the piston rods 40 thereof will extend well toward the forward end of the lifting arms 16.

The distance between the pivotal mountings of the rearward end of the lifting arms 16 and the rearward ends of the hydraulic jacks 32 is preferably such as to form a triangle between the lifting arms 16 and their corresponding hydraulic jacks and supporting plates, the angle formed between the supporting plates 18 and their corresponding hydraulic jacks 32 is preferably an angle approaching 90 degrees or greater at times when the lifting arms 16 are in their lowest position.

At times when the lifting arms 16 are in raised positions, the angle formed between the supporting plates 18 and the corresponding hydraulic jacks 32 becomes more and more acute until at times when the lifting arms 16 are in their uppermost position, preferably the hydraulic jacks 32 will be substantially parallel with the lifting arms 16.

A scoop 58 having tines 60 is pivotally mounted by means of a pair of bolts 62 disposed at either side thereof to the outer ends of the lifting arms 16.

Means are provided for controlling the position of the scoop with respect to the lifting arms 16 and such means includes two cross bars 64 rigidly attached to each of the lifting arms 16 closely adjacent the rearward wall 66 of the scoop 58.

The rearward wall 66 of the scoop is provided with a detent 67 attached thereto. An upper surface of the detent 67 is disposed slightly upwardly declined with respect to the rearward wall 66 of the scoop. The detent 67 is secured to the rearward side 66, and a brace 68 is secured to the forward side of the wall 66, opposite the detent 67.

The brace 68 extends downwardly and is secured to one of the tines 60 and is secured to the rearward wall 66 by means of a bolted flange 69.

A latch or hook 70 is provided for the purpose of engaging the detent 67 at desired times. The latch-hook 70 is secured to a swinging bar 71 which latter extends between and transversely of the booms 16. The bar 71 is pivotally secured to a mounting plate 72, which latter is disposed across and secured to the crossbars 64 adjacent one of the booms 16.

The latch 70 is attached to the swinging bar 71 adjacent the middle thereof and the other end of the bar 71 is pivotally attached to a draw rod 73.

The draw rod 73 extends above and lengthwise of the adjacent boom 16 and at its rearward end is pivotally secured to a medial point along a hand lever 74; the latter being pivotally secured to the upper side of the boom 16 by means of a tab 75.

As thus described the lever 74 may be pulled rearwardly by the operator to disengage the latch-hook 70 from the upper side of the detent 67.

In order to maintain the latch 70 in engagement with the detent 67 at desired times, a coiled compression spring 76 is provided and is disposed between a backing member 77 attached to the rearwardmost of the crossbar 64, the forward end of the compression spring 76 urging forwardly against a block 78, which latter is firmly attached to the swinging bar 71, for urging the bar 71 and to the latch 70 forwardly.

The foregoing described parts of the material moving mechanism are old in the art and the mechanism of this invention for automatically tilting the scoop 58 will now be described.

Such mechanism includes an arm 90 disposed transversely of one of the booms 16. The arm 90 is preferably disposed on the tractor side of the boom.

The arm 90 is pivotally secured, at a point 92 between the ends of the arm, to the boom 16. The upper end of the arm 90 is provided with an aperture 94 into which is secured a hook mounted at the rearward end of a tension spring 96.

The forward end of the spring 96 is hooked into an eyelet 98 of a pull cable 100. The pull cable 100 extends longitudinally of the corresponding boom 16 and is preferably at all times disposed above the said boom 16.

At its forward end the pull cable 100 is secured to a connection bar 102. The manner of connection employed is that the cable 100 extends through one of two spaced apart apertures in the connection bar 102 then doubles back through the bar 102 through the other of the apertures, and forms a halfhitch upon itself, as best shown in Figure 2. The forward end of the connection bar 102 is pivotally secured by a pin 104 to a side wall of the scoop 58.

The pin 104 is disposed at a point on the same side of the adjacent boom 16 that the upper end of the arm 90 is disposed. In other words, the pin 104 is disposed on the same side, as the upper end of the arm 90, of a line drawn between the pivotal attachment 62 between the scoop 58 and the adjacent boom 66 and the pivotal connection point 22 between the rearward end of the boom 16 and the upper ear 20.

A detent 108 is provided and is secured to the boom 16 behind the pivot point 92 in the path of the arm 90 so that the arm or tension bar 90 will be arrested to prevent excessive clockwise pivotal movement thereof during dumping of the scoop.

The lower portion of the arm 90, beneath the pivotal connection 92, is disposed engaging a detent ring 110. The detent ring 110 is disposed about and secured to the jack cylinder 32.

As thus described, at times when the scoop 58 is in the shoveling position shown in Figure 2 with its bottom parallel to the surface of the ground 70', the lower end of the arms 90 will be held in a forward position as shown in Figure 2. The upper end of the arm 90 will thus be maintained in a rearward position for pulling rearwardly on the upper side of the scoop 58 at the pivot pin 104. This automatically maintains the scoop 58 in the position shown in Figure 2 with its bottom parallel to the surface of the ground 70.

As the operator causes the scoop 58 to be elevated toward the dotted line position shown in Figure 2, the lower end of the arm 90 will be caused to move to a rearward position, since while the jack cylinder 32 and the ring 110 swing upwardly, they also move slightly rearwardly.

This rearward motion will in turn cause the forward motion of the upper end of the arm 90, permitting the cable 100 to slacken. When the cable 100 is slack, the operator may then pull rearwardly on the lever 74, causing the latch 70 to release the scoop 58 for dumping.

When it is desired to return the scoop 58 to a shoveling position, the operator need only lower the boom, and the arm 90 will cause a rearward pull upon the upper portion of the scoop 58 for causing the scoop 58 to automatically return to a shoveling position, as best shown in full lines in Figure 2.

It will be seen that this invention has provided means for automatically returning the scoop of a material moving mechanism into shoveling position at desired times and for automatically releasing the scoop to permit manual dumping at other desired times and with out the necessity of independent action by the operator for the purpose of adjusting the scoop into shoveling position.

From the foregoing description, it is thought to be obvious that a scoop swinging mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

A material moving scoop comprising a pair of vertically disposed brackets, means on the brackets for attaching the brackets to an axle of a tractor, a scoop having a bottom with tines thereon, a rear wall and sides, a pair of lifting arms pivotally attached at one of the ends thereof to the upper ends of the brackets and pivotally attached at the other of the ends thereof to the sides of the scoop, a pair of hydraulic jacks pivotally attached at one of the ends thereof to the lower ends of the brackets and at the other of the ends thereof to said arms, a ring positioned on one of said hydraulic jacks, a cross bar extended between said arms and spaced from the rear wall of the scoop, a mounting plate extended from said cross bar and spaced from one of said arms, a transversely disposed swinging bar pivotally attached at one end to said mounting plate and extended across to the arm on the opposite side of the scoop, a hand lever pivotally mounted on and carried by the said arm on the opposite side of the scoop, a draw bar connecting the swinging bar to the hand lever, a latch carried by the swinging bar for retaining the scoop in a material carrying position, a tension bar pivotally mounted on said hand lever carrying arm and positioned to be engaged by the ring on the hydraulic jack which is positioned below said hand lever carrying arm, a spring attached to the upper end of said tension bar, a connection bar attached to the side of the scoop on which the hand lever carrying arm is positioned, the point where the connection bar is attached to the scoop being positioned above the pivotal mounting of the scoop, and a cable connecting the spring of the tension bar to the connection bar whereby upon upward travel of the scoop tension on the scoop retaining cable is relieved and upon lowering of the scoop to scooping position the tension bar is actuated by the ring on the hydraulic jack for drawing the scoop to a horizontal position.

STEPHEN S. POKORNY.

REFERENCES CITED

The following references are of record in the file of this patent:

UNITED STATES PATENTS

| Number | Name | Date |
|---|---|---|
| 2,001,803 | Stephens | May 21, 1935 |
| 2,398,964 | Rogers et al. | Apr. 23, 1946 |
| 2,437,808 | Drettmann | Mar. 16, 1948 |
| 2,455,474 | Drott et al. | Dec. 7, 1948 |
| 2,457,049 | Lacey | Dec. 21, 1948 |
| 2,482,365 | Pokorny | Sept. 20, 1949 |
| 2,482,612 | Drott et al. | Sept. 20, 1949 |
| 2,503,577 | Borgelt | Apr. 11, 1950 |
| 2,535,727 | Dingley | Dec. 26, 1950 |